Aug. 4, 1931. S. G. RUSSELL 1,817,102
FISHING REEL
Filed Sept. 29, 1928
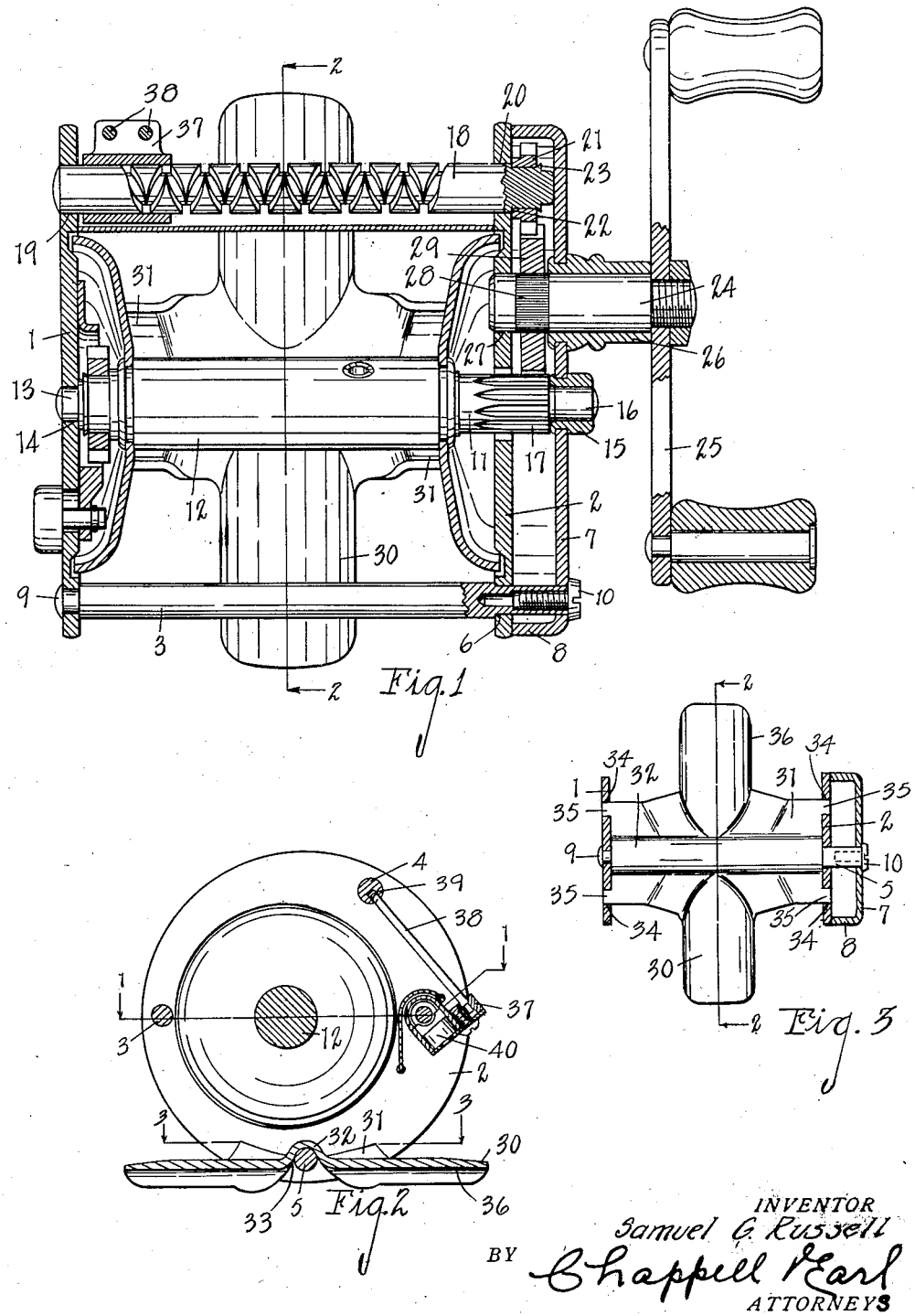
INVENTOR
Samuel G. Russell
BY Chappell & Earl
ATTORNEYS Patented Aug. 4, 1931

1,817,102

UNITED STATES PATENT OFFICE

AMUEL G. RUSSELL, OF KALAMAZOO, MICHIGAN, ASSIGNOR TO SHAKESPEARE COMPANY, OF KALAMAZOO, MICHIGAN

FISHING REEL

Application filed September 29, 1928. Serial No. 309,154.

The main objects of this invention are:

First, to provide a level winding fishing reel which is substantial and durable in structure and at the same time very economical.

Second, to provide in a fishing reel an improved mounting for the crank spindle.

Third, to provide an improved reel seat which is economical in structure, is strong and rigid, and at the same time attractive in appearance.

Objects pertaining to details and economies of my invention will definitely appear from the description to follow. The invention is defined in the claims.

A structure which embodies the features of my invention is clearly illustrated in the accompanying drawings, in which:

Fig. 1 is a fragmentary view of a fishing reel embodying my improvements partially in horizontal section on a line corresponding to line 1—1 of Fig. 2.

Fig. 2 is a vertical section on line 2—2 of Figs. 1 and 3.

Fig. 3 is a detail section on line 3—3 of Fig. 2 showing details of the reel seat and frame structure.

Referring to the drawings, the frame of the reel comprises a tail end plate 1, head end plate 2 and the connecting pillars 3, 4 and 5. These pillars are shouldered at 6 to receive the head end plate 2 and housing member 7 which has a peripheral flange 8 abutting the outer side of the plate 2. The pillars are secured to the tail end plate by riveting as at 9 and the head members are removably secured by means of the screws 10 threaded longitudinally into the pillars. The head members 2 and 7 provide a gear housing.

The shaft 11 of the spool 12 is provided with a journal portion 13 coacting with a bearing 14 in the tail end member, this being in the form of a hole in the plate. The head member 7 is provided with a bearing 15 for the journal 16 of the shaft. A pinion 17 is formed on the spool.

The traversing shaft 18 is arranged in bearing openings 19 and 20 in the end plates and projects into the head housing. A pinion 21 is secured against the shoulder 22 on the traversing shaft by upsetting at 23. This pinion limits the axial movement of the traversing shaft in one direction while the housing plate 7 coacting with the end of the shaft limits its axial movement in the opposite direction. This avoids the necessity of providing bearings for the traversing shaft and the parts are economical to produce and assemble.

The spindle 24 of the crank 25 is supported in a bearing 26 mounted on the housing member 7. The head plate 2 has a bearing opening 27 therein for the inner end of the spindle. This permits the bearing portions of the spindle and the intermediate portion thereof to be made of uniform diameter from end to end, eliminating machine work. The portion 28 of the spindle between the bearing portions is slightly knurled or roughened to provide more effective engagement for the driving gear 29 which is pressed upon the spindle. This driving gear meshes with the traversing and spool shaft pinions. By thus mounting the spindle it is supported to effectively withstand the lateral and other strains to which it is subjected in use and machine work is minimized.

The reel seat member designated generally by the numeral 30 is preferably formed as a sheet metal stamping and comprises a web-like body portion 31 having a central longitudinal rib 32 struck up therein providing a downwardly facing groove or channel 33 engaged by the pillar 5 which constitutes a tie rod clamping the end plates upon the reel seat member. The plates are provided with holes 34 to receive the lugs 35 on the reel seat member.

The fishing rod engaging arms 36 are of curved cross section, the curved portions extending into the body portion of the seat member. By thus conforming the seat member it may, as stated, be formed as a sheet metal stamping, and at the same time is strong, rigid and attractive in appearance.

The carriage 37 is reciprocatingly mounted on the traversing shaft provided with a line guide eye 38 engaging a groove 39 in the pillar 4. The carriage is provided with a pawl 40 co-acting with the traversing shaft. The details of the carriage, however, form no part of my present invention.

My improvements enable the very economical manufacture of fishing reels with comparatively little machine work and labor in assembling. At the same time the structure is attractive in appearance and strong and rigid.

Having thus described my invention what I claim as new and desire to secure by Letters Patent is:

1. In a fishing reel, the combination of a frame comprising head and tail end plates and connecting pillars, a head housing member provided with a flange coacting with said head plate to provide a housing, said end plates being provided with alined holes constituting traversing shaft bearings, a traversing shaft journaled in said bearings to project into said housing, a pinion on said shaft within said housing limiting its axial movement in one direction, the housing plate limiting its axial movement in the opposite direction, a spool provided with a shaft, said tail plate being provided with a bearing opening for said shaft, said housing plate being provided with a bearing for the opposite end of said shaft, said shaft having a pinion within said housing, a crank spindle bearing mounted on said housing plate, said head plate having a bearing opening therein alined with said spindle bearing on said housing plate, a crank spindle arranged in said spindle bearing with its inner end in said bearing in said head plate, and a driving gear on said spindle meshing with said traversing shaft and spool shaft pinions.

2. In a fishing reel, the combination of a frame comprising head and tail end plates and connecting pillars, a head housing member provided with a flange coacting with said head plate to provide a housing, said end plates being provided with alined holes constituting traversing shaft bearings, a traversing shaft journaled in said bearings to project into said housing, a pinion on said shaft within said housing limiting its axial movement in one direction, the housing plate limiting its axial movement in the opposite direction, a crank spindle bearing mounted on said housing plate, said head plate having a bearing opening therein alined with said spindle bearing on said housing plate, a crank spindle arranged in said spindle bearing with its inner end in said bearing opening in said head plate, and a driving gear on said spindle meshing with said traversing shaft pinion.

3. In a fishing reel, the combination of a frame comprising head and tail end plates and connecting pillars, a head housing member provided with a flange coacting with said head plate to provide a housing, said end plates being provided with alined holes constituting traversing shaft bearings, a traversing shaft journaled in said bearings to project into said housing, a pinion on said shaft within said housing limiting its axial movement in one direction, the housing plate limiting its axial movement in the opposite direction, and a driving gear meshing with said traversing shaft pinion.

4. In a fishing reel, the combination with a frame comprising end members having opposed openings therein, a reel seat formed as an integral unit and having a web-like body portion having a central longitudinal corrugation-like rib providing a downwardly facing channel, said body portion being provided with lugs at its ends engaging said openings in said frame end members, said body having oppositely projecting transversely curved rod engaging arms, the curvature of which extends into the said body portion, and a tie rod secured to said end plates and disposed in said channel and having supporting engagement with the walls thereof.

5. In a fishing reel, the combination with a frame comprising end members having opposed openings therein, a reel seat formed as an integral unit and having a web-like body portion having a central longitudinal corrugation-like rib providing a downwardly facing channel, said body portion being provided with lugs at its ends engaging said openings in said frame end members, said body having oppositely projecting rod engaging arms, and a tie rod secured to said end plates and disposed in said channel and having supporting engagement with the walls thereof.

6. In a fishing reel, the combination with a frame comprising end members having opposed openings therein, a reel seat formed as an integral unit and having a web-like body portion having a central longitudinal corrugation-like rib providing a downwardly facing channel, said body portion being provided with lugs at its ends engaging said openings in said frame end members, said body having oppositely projecting transversely curved rod engaging arms, the curvature of which extends into the said body portion, and a tie rod secured to said end plates and disposed in said channel.

In witness whereof I have hereunto set my hand.

SAMUEL G. RUSSELL.